United States Patent [19]

Gross et al.

[11] 3,874,626
[45] Apr. 1, 1975

[54] SEAT, PARTICULARLY FOR AUTOMOTIVE VEHICLES

[75] Inventors: Karl-Ulrich Gross; Jürgen Sroka, both of Hilden; Kurt Biesen, Solingen, all of Germany

[73] Assignee: Bremshey Aktiengesellschaft, Solingen-Ohligs, Germany

[22] Filed: July 9, 1973

[21] Appl. No.: 377,725

[30] Foreign Application Priority Data
July 8, 1972   Germany.............................. 2233674
June 1, 1973   Germany.............................. 2327850

[52] U.S. Cl................................ 248/399, 248/421
[51] Int. Cl.............................................. F16m 13/00
[58] Field of Search........... 248/399, 400, 401, 402, 248/403, 421, 422, 424, 429

[56] References Cited
UNITED STATES PATENTS
1,898,444   2/1933   Hawkins.............................. 248/421
2,229,769   1/1941   Raders................................. 248/402
2,573,077   10/1951  White et al.......................... 248/400
2,986,199   5/1961   Ferreira et al....................... 248/429
3,140,851   7/1964   Bilancia.............................. 248/399
3,285,562   11/1966  Langer................................ 248/399
3,679,166   7/1972   Sturham.............................. 248/399

FOREIGN PATENTS OR APPLICATIONS
537,098    6/1941   United Kingdom................ 248/421
635,957    4/1950   United Kingdom................ 248/396
2,053,501  5/1971   Germany............................. 248/399
265,739    6/1970   U.S.S.R.............................. 248/399
81,580     3/1953   Norway............................... 248/402

Primary Examiner—Marion Parsons, Jr.
Attorney, Agent, or Firm—Ernest G. Montague; Karl F. Ross; Herbert Dubno

[57] ABSTRACT

A seat, particularly for automotive vehicles, which comprises a seat-surface support and a seat base including links. The seat-surface support is spring-biased in the vertical direction and is guided by the links of the seat base. A force-storage compression spring is disposed below the seat-surface support. An abutment means is associated with one end of the force-storage compression spring for adjustment of the initial spring tension by displacement of the height of the abutment means. A threaded spindle supports the abutment means. A switch ratchet mechanism actuates the threaded spindle, and the latter extends into the inside of the compression spring.

12 Claims, 15 Drawing Figures

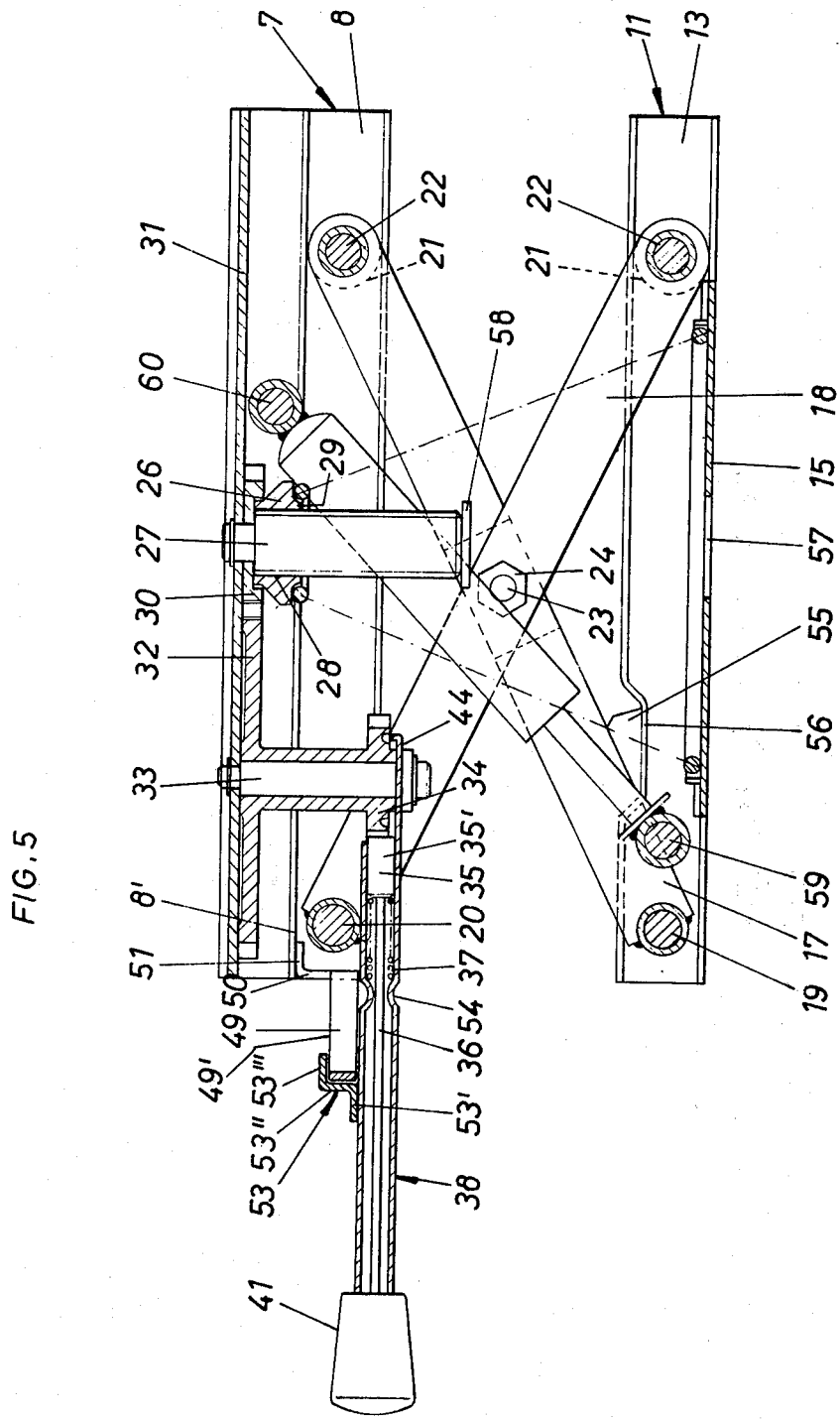

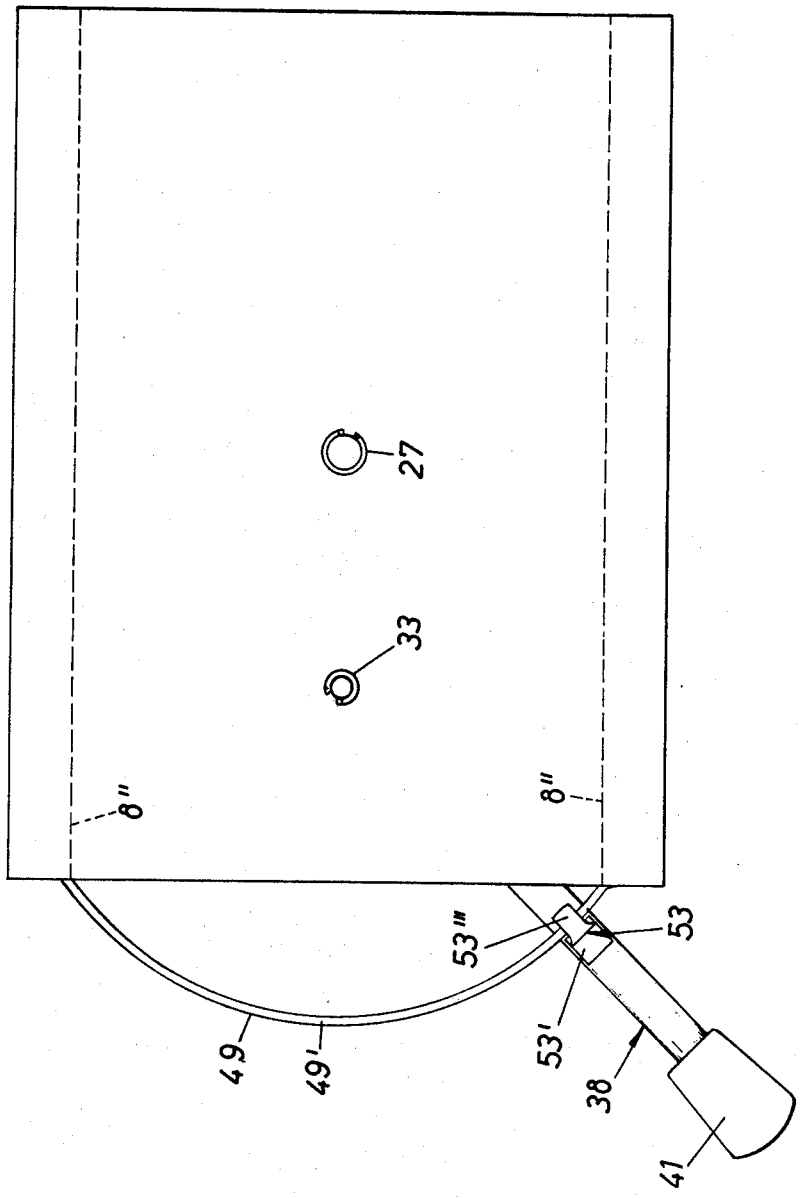

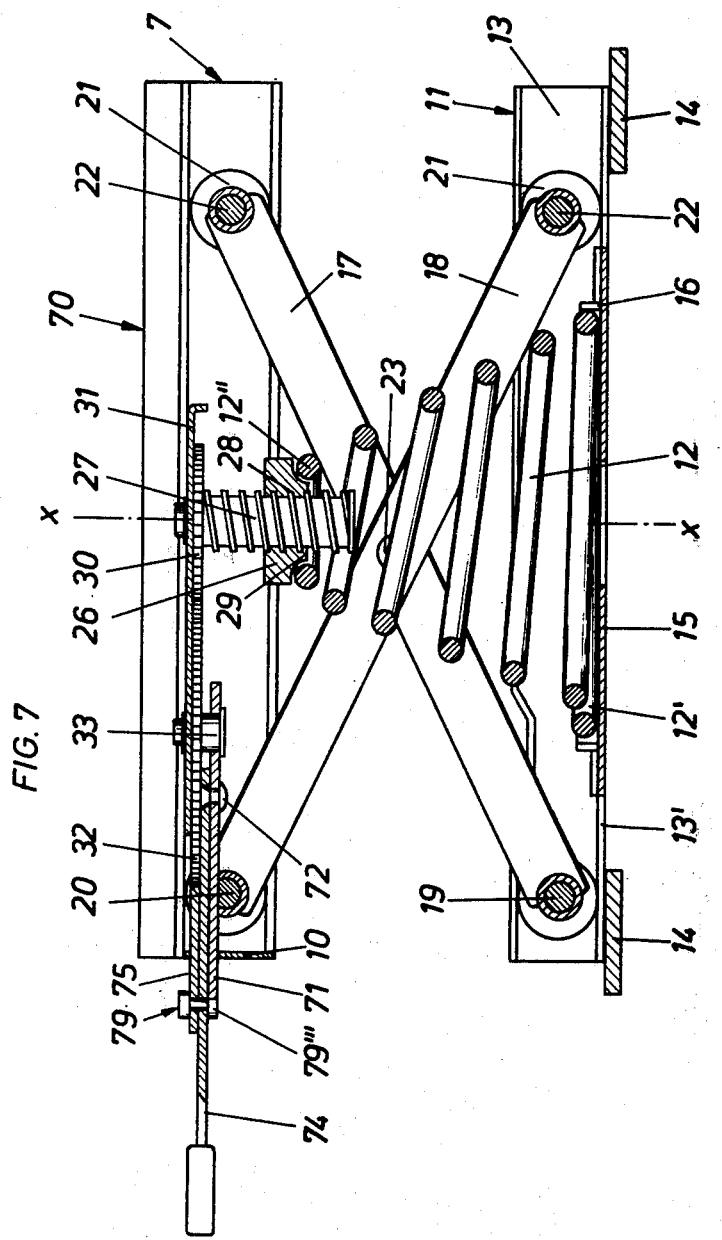

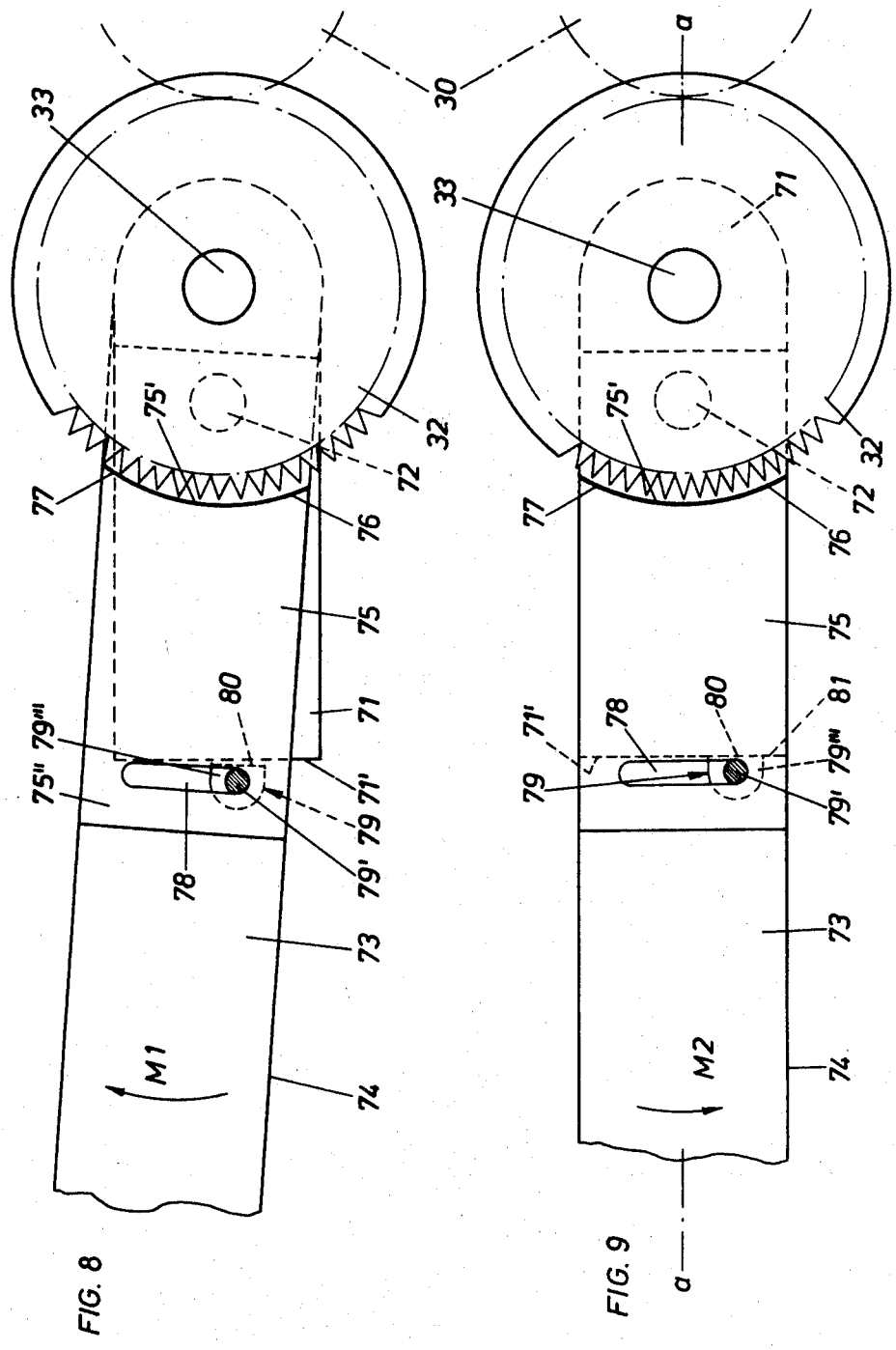

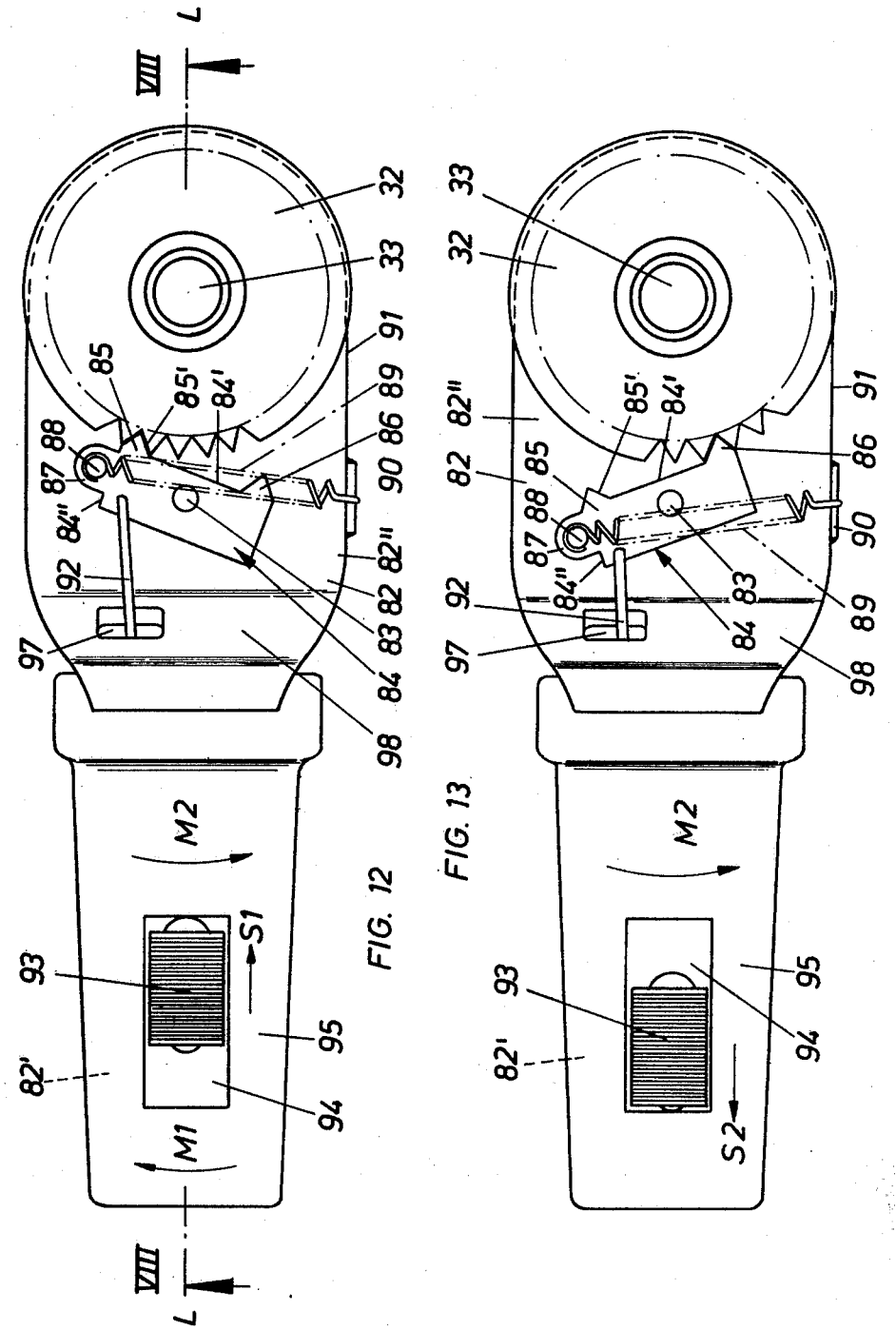

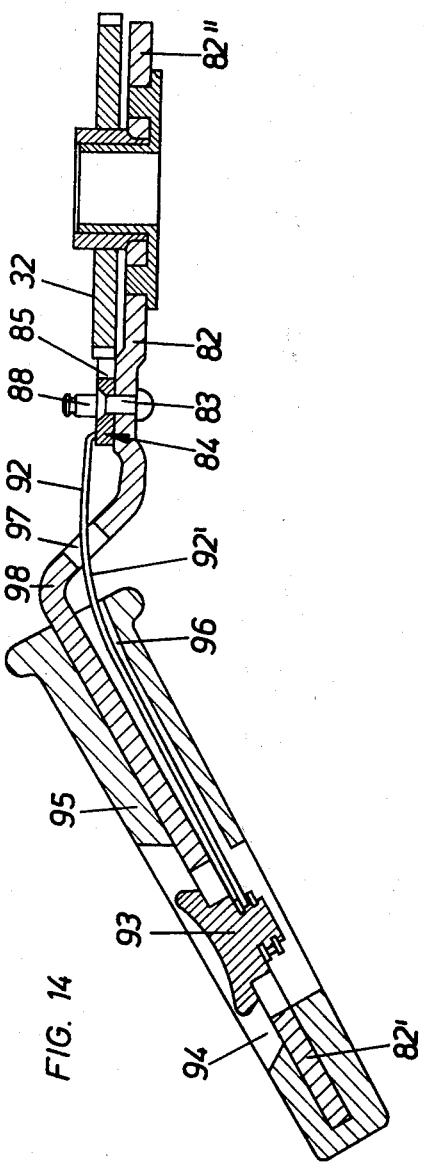
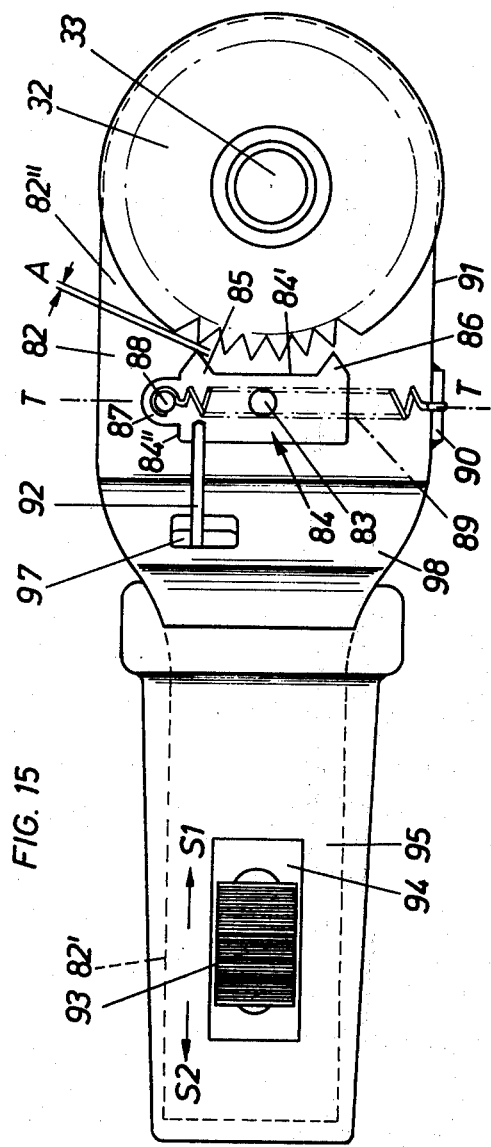
FIG. 14
FIG. 15

SEAT, PARTICULARLY FOR AUTOMOTIVE VEHICLES

The present invention relates to a seat, particularly for automotive vehicles, having a seat-surface support urged by spring in vertical direction; the seat-surface support is guided by links of the seat base and below this support there is arranged a force-storage compression spring whose initial force or preload is adjustable by shifting the height of an abutment cooperating with one end of the spring.

In one known construction, the seat-surface support rests on swing arms extending from the seat base. These arms permit a displacement of the seat in the vertical direction. As a result of the design, the change in position in vertical direction takes place on a swing arc. The conical spring which acts via adjusting means on the seat-surface support is brought, upon this displacement of the seat, out of its basic pyramidal position, i.e., is bent laterally. This has the result that the advantage of a conical compression spring with respect to a space-saving telescoping of the turns of different diameter is reduced or even lost. In addition, with this known construction, there is also the disadvantage that the setting means which changes the moment of resistance of the spring also displaces the end of the spring in a direction transverse to the axis of the spring, again resulting in lateral deflection or bending. The superimposing of these two bending movements, if it is desired to provide them to the largest possible extents, leads to the danger of kinking the spring. The individual turns of the spring can also strike against each other so that the maximum vertical displacement is impaired. By the rubbing of the individual turns of the spring, unnecessary noises further result.

It is an object of the present invention to provide a seat of this type which uses a conical spring and having the capacity to change the moment of resistance of the spring, but which permits an orderly, i.e., nonrubbing, dovetailing of the individual turns of the spring so that it is possible to bring the supporting and supported parts of the seat practically into contact with each other.

It is another object of the present invention to provide an improved seat, particularly for automotive vehicles, which comprises a seat-surface support and a seat base including links, whereby the seat-surface support is spring-biased in vertical direction and guided by the links of the seat base.

According to the invention the spring abutment is seated on a threaded spindle extending coaxially into the interior of the compression spring while a link-controlled perfectly vertical displacement of the seat is provided, whereby a non-rubbing nesting of the spring turns in each other avoiding any squeaking thereof is obtained. The spindle is arranged within the space which is required for the force-storage compression spring. The force which varies the moment of resistance of the spring acts centrally on the spring body. The threaded spindle is advantageously actuated by a switch-over ratchet mechanism. Since the spindle protrudes from the bottom of the seat-surface support, the corresponding actuating means also lie on the moving part of the seat. Their position is therefore unchanged relative to the seat surface, which simplifies the adjustment operation. The end of smaller cross-section of the conical compression spring acts directly on the abutment, while the base rests on the seat base. The setting means can comprise a gear which lies on the bottom of the seat-surface supporting plate and is fixed to the spindle, this gear meshing with a transmission gear on whose shaft there is arranged the switch-over ratchet pawl whose operating swing lever extends over the front edge of the seat-surface support. The operating handle is furthermore designed in such manner that it can also be used simultaneously for switching the effective direction of locking. The lock pin, which is supported longitudinally displaceable therein and has a corresponding lock tooth, is lifted out of the ratchet wheel in order to change the direction of locking, turned, and again brought into engagement with this wheel. The final structural measure of supporting the operating swing lever towards the floor on a slide yoke leads to a construction which is capable of taking up extreme load. The support can be produced by a slot-forming end stops at a corresponding place on the seat-surface support or else in the form of a bow which is bent corresponding to the radius of swing of the operating lever and over which there then extends a slide piece extending from the operating lever.

As a result of a further embodiment, there is also the possibility of effecting the displacement of the seat by force-locked driving of the setting-device drive gear. The switching to the specific direction of drive is effected by means of a few very simple structural parts. Accordingly, the adjusting device can be kept of small construction and, despite its dependability in operation, be produced at minimum manufacturing expense and thus cheaply. The force-locked drive can take place on a circular disk which is associated with the setting-device drive gear developed as step-up gear, but it can also take place directly on the addendum circle of the toothing of the setting-device drive gear. There is even the possibility of having the locking flanks of the swing lever engage directly on the gear borne by the spindle or on a disk-shaped structural part which takes the place of the gear and is sufficiently without teeth for the function. The swing lever need in this connection merely be pivoted swingably at its fulcrum, i.e., it need not be displaceable radially of its arc of swing, since the driving of the setting-device drive gear in one direction or the other is effected solely by the swinging of the swing lever in the corresponding direction of actuation in positive fashion by the locking flanks. The locking flanks are advantageously brought directly into their position of engagement. The strength of the clamping and the idle stroke of the swing lever can be determined by the amount of the distance between the axis of the setting-device drive gear and the pivot point of the setting-device operating lever. As a result of the separate pivot points of the swing lever and the drive gear, dependable driving is assured, since the clamping between the locking flanks and the drive gear is increased upon an increase in the opposing forces. Furthermore, this results in the advantage that at any desired distance from the setting-device drive gear, there is obtained a further possibility of locking, namely between the switch-over handle and the end surface of the extension. The switch-over handle is so arranged, that in the corresponding position of the drive-swing direction at the same time it makes possible the free swinging back of the setting-device operating lever, in the manner that upon the attainment of the aligned position between setting-device operating lever and extension, it comes against the end surface of the extension and thus prevents a clamping of the locking flank for the opposite direction of drive-swing. This function is fulfilled by the switch-over handle in both directions of actuating swing in the same way by simple displacement in the transverse slot. The switch-over handle in this connection, despite direct action on the setting device, lies in a position favorable for actuation outside the seat base. The structural parts which are clamped against each other lie in a position in which they are protected in use and avoid possible injury or unintended pinching, for instance, of the trousers of the user. The displacement of the switch-over handle can in this connection take place at the end which lies opposite the clamping section and is arranged above the setting-device operating lever. The clamping between the switch-over handle and extension upon the swinging back of the setting-device operating lever takes place in a manner which is very gentle on the material. The compression forces which distribute themselves over a surface, so that no damage, i.e., notchings, can occur on the front edge of the extension even after a long period of use. When using the toggle-shaped locking pawl, the point of rotation of the setting-device actuating lever can be seated on the shaft of the setting-device drive gear. The specific direction of drive of the drive gear is determined by simple displacement of the switch-over lever. The switching can be effected in this case also in a manner favorable for grasp by the hand outside the seat base directly on the handle of the setting-device operating lever. The switch-over handle need not be fixed in position, since once the desired direction of drive has been established upon the ratchet actuation, the corresponding lock tooth of the locking pawl, it is true, emerges from the toothing of the setting-device drive gear but does not yet pass into the dead-center line, so that the locking tooth is constantly pulled back into detent engagement under the action of the locking-pawl tension spring. The switch-over handle therefore does not serve for the maintaining of the tooth engagement, but merely for shifting the locking-pawl tension spring into the corresponding lateral position with respect to the dead-center line.

These and other objects will become more readily apparent from the following description, reference being made to the accompanying drawings, in which:

FIG. 5 is another embodiment of a vertical section of the seat base;

FIG. 6 is a top plan view of the seat base disclosed in FIG. 5;

FIG. 7 is a longitudinal section through the setting device of another embodiment;

FIG. 8 is an elevation of the setting-device operating lever and the setting-device drive gear upon actuation for the compressing of the force-storage compression spring in accordance with the first described embodiment;

FIG. 9 is an elevation of the setting-device operating lever and setting-device drive gear upon the free swinging back of the operating lever;

FIG. 12 is an elevation of the setting-device operating lever and setting-device drive gear in accordance with the second embodiment in the one position of engagement of the locking pawl;

FIG. 13 is an elevation of the setting-device operating lever and setting-device drive gear in accordance with the second embodiment in a different position of the locking pawl;

FIG. 14 is a cross-section along the lines VIII—VIII of FIG. 12; and

FIG. 15 is an elevation of the setting-device operating lever and setting-device drive gear in accordance with the second embodiment at the dead-center position of the locking-pawl tension spring.

Figure 1:
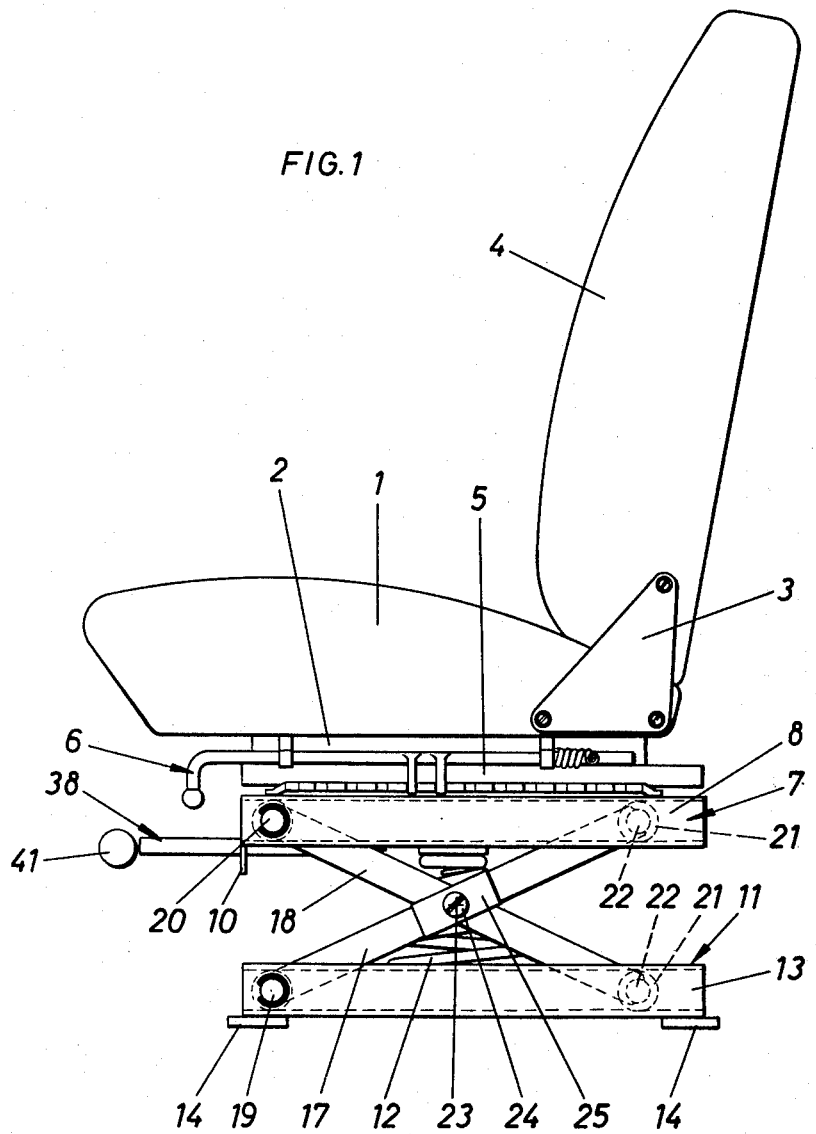
FIG. 1 is a side elevation of the seat of the present invention.
Figure 2:
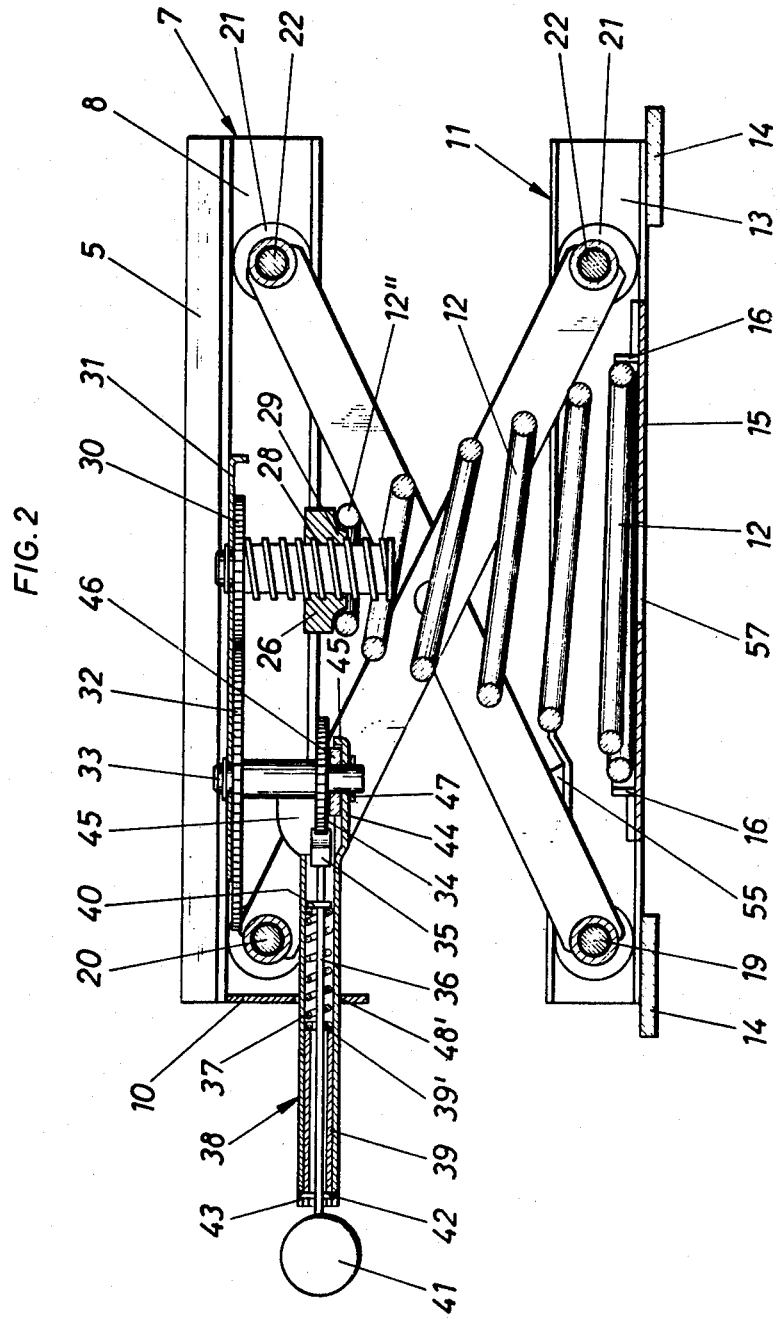
FIG. 2 is a vertical section of the seat base without a seat.
Figure 3:
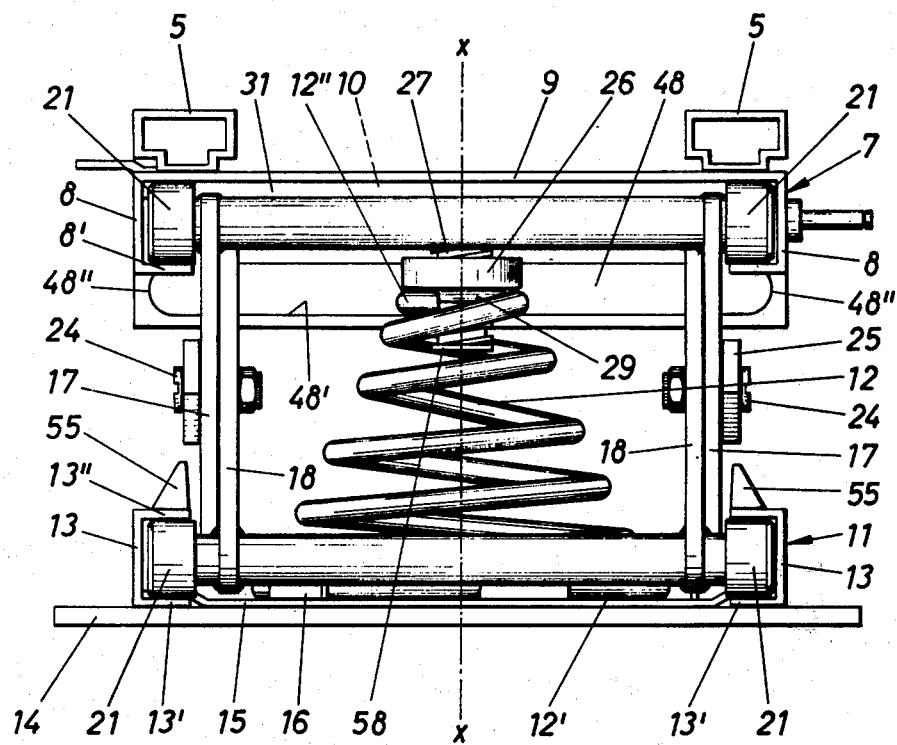
FIG. 3 is a rear view of this seat base.

The car seat, as shown in FIGS. 1 and 2, has a frame 2 which bears the cushion 1 and from which in the region of its rear two upward directed cheeks 3 extend, which bear the journals (not shown in detail) for the tiltable back-rest frame which is also covered by a cushion 4.

The entire assembly is based on guide rails 5 which make it possible to displace the seat in the direction of travel. The corresponding lock means are identified by the numeral 6.

The rails 5 are connected with a seat or seat-surface support 7. The latter consists of two U-rails 8 which are connected with each other by means of cross pieces 9 and 10 which are fastened in the vicinity of the ends of the rails. The cross piece 10 extends vertically and forms the front wall of the seat-surface support 7.

The seat-surface support 7 can be displaced vertically with respect to the seat frame 11, which bears it and is supported centrally by a conical force-storage compression spring 12.

The seat base is also developed as a frame. It also has U-rails 13. The latter are in their turn connected with each other by transverse members 14 as well as a supporting plate 15 arranged in the central region of the frame.

Ths supporting plate 15 rests on the bottom U-arms 13' of the U-rails 13 and forms the support for the compression spring 12, the largest spring turn 12' of which rests here supported radially by lugs 16.

Seat-surface support 7 and seat-base frame 11 are connected via links 17 and 18 which cross each other. The links 18 extend in the immediate vicinity of the rails 8 and 13. The links 17 swing around fixed pivot pins 19 on the seat-base frame 11, while the links 18 swing around fixed pivot pins 20 on the seat-surface support 7. The free ends of the two links bear guide pins 22 provided with rollers 21, the pins extending into the U-shaped space of the corresponding rails 8 and 13. At the point of intersection of the two links, a pivot pin 23 is provided in the form of two screw bolts 24. For the increased radial support of the screw bolts 24, a plate 25 which at the same time reinforces the section there is provided. This plate is seated on the outside links 17. This association of the links brings a displacement of the seat support 7 parallel to the seat-base frame 11. For the interposed force-storage compression spring 12 there accordingly results an action by pressure in the axis x—x, this also with a change in the resistance of the spring. This change is transmitted via an abutment 26 which is coaxial to the compression spring 12. The abutment is seated on a screw spindle 27. The latter extends from the bottom of the seat-surface support 7 into the inside of the compression spring 12. The abutment has an inner thread 28 and, by means of a centering protrusion 29, extends by an amount equal to the cross section of the spring wire into the end turn 12", which is dimensioned correspondingly large.

The application pressure, established by the initial tension of the spring 12, is sufficient for the holding of the abutment 26 secure against rotation with respect to the rotatably arranged spindle 27.

The spindle 27 bears a gear 30 which is firmly connected to it. This gear has spur teeth and rests with a wide surface on the supporting plate 31 which supports it. The gear 30 cooperates with a transmission gear 32 which is also supported in the plate 31 and on the downward-extending shaft 33 of which there is seated a ratchet wheel 34 into the spur gearing of which a detent tooth 35 of a locking pin 36 which in direction of engagement is under spring action, extends. The spring is identified by the numeral 37. Spring, locking pin and locking tooth which, together with the ratchet disk 34, form the ratchet mechanism, can be actuated in the inside of an operating swing lever 38 emerging from the front plate 9. For this lever, a round tube is used. A sleeve 39, inserted from the free end and secured in position, forms at its inward directed end 39' the one spring abutment, while the abutment on the locking-lever side is formed by a transverse cotter or, as shown in FIG. 2, by a disk 40 which is placed on and secured in position.

Figure 4:
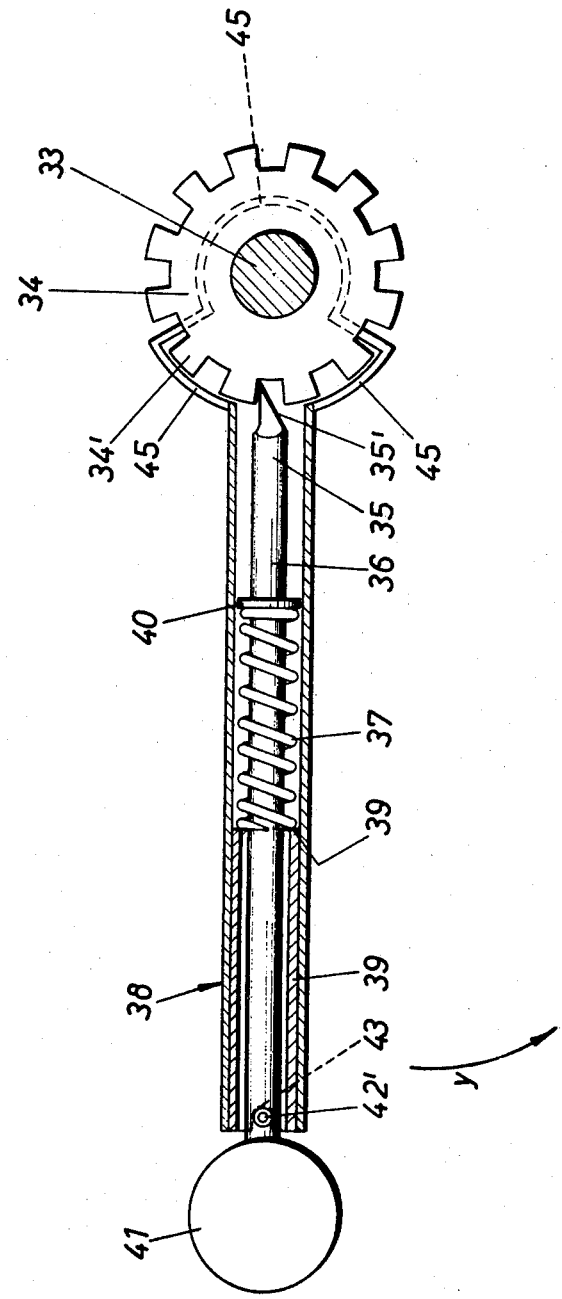
FIG. 4 is an elevation of the switch-over ratchet mechanism by itself.

The rear 35' of the locking tooth 35 is beveled. With the alignment of this tooth shown in FIG. 4, the operating swing lever 38 can be swung around the shaft 33 in the direction indicated by the arrow y. In this connection the tooth 35 slides over the tooth 34' of the stationary ratchet disk. A subsequent movement of the operating swing lever in the direction opposite the direction of the arrow y leads to the driving along of the disk 34 and thus to a rotation of the transmission gear 32 which transmits the rotation finally to the spindle 27, so that a displacement of the abutment 26 takes place. In order now to be able to displace the abutment by lever actuation in both directions, the lock is designed as a switch-over ratchet mechanism, i.e., measures are provided which permit a turning over of the tooth 35 so that the tooth back 35' can also be brought into a position, in which the ratchet disk 34 is driven in the opposite direction. In order to turn the tooth 35, it is merely necessary to pull out, against the action of the spring, the locking bolt 36 provided with a handle 41 to such an extent that a transverse pin 42 of said bolt which locks both end positions emerges from the transverse slot 43 extending from the free end in order, after turning by 180°, to enter the other basic position. The spring 37 thus fulfills a twofold function - on the one hand it serves its actual purpose as detent spring and on the other hand serves as holding spring securing the specific basic position.

The requirements of a strong construction of the detent mechanism are also taken into account. Thus the bearing lug 44 for the pivoting of the lever 38 is reinforced by upward-bent ribs 45 extending integrally from it and which at the same time protect the ratchet disk, these ribs continuing on the lever side, by a weld connection or the like, into the tubular wall of the operating lever 38. The ribs 45 merely decrease in height at the section lying opposite the lever, forming a pot-shaped bottom section for the supporting of the protective disk 46 of self-lubricating material. For the supporting of the operating swing lever 38 on the shaft side there serves a cotter 47 which passes transversely through the shaft 33. The free end of the operating swing lever 38 lies on the lower slot edge 48' of a horizontally extending slot 48, provided in the front plate 10, the slot ends thereof, 48" which are adapted to the cross section of curvature of the operating swing lever, forming stops.

In the embodiments shown in FIGS. 5 and 6 the supporting of the free end of the operating swing lever 38 is obtained by a slide bow 49 which extends beyond the front plate and the upward bent end lugs 50 of which form fastening flanges 51 which are welded to the bottom of the U-arm 8' of the U-rail 8.

The slide-bow assumes an arcuate course which corresponds to the radius of swing of the operating lever 38. A slide piece 53 extends over its upper edge 48'. There is concerned here a double-bent structural part the one angle arm 53' of which is curved corresponding to the transverse curvature of the operating swing lever and held fast by welding, riveting or the like. The arm 53''' of the slide piece which extends over the upper edge 49' of the yoke adjoins the web 53" lying parallel to the yoke.

The end stop is formed here by the end edges 8" of the arms 8' of the U-members 8 of the seat-surface support 7.

The other structural measures correspond to those of the first embodiment described in detail above. Certain differences are present in particular in the development of the operating swing lever whose return spring 37 is now supported on the lever side by an indented annular groove 54.

Both embodiments furthermore have rubber bumpers 55 as damping stops for the seat-surface support 7. These rubber bumpers 55 are seated on the upper U-leg 13" of the U-rails 13. The U-legs 8' of the upper U-rails 8 strike against same. The bumpers 55 are beveled on their outward directed surface in such a manner that the bumpers have approximately a pointed end. They are inserted in an indentation 56 of the U-rails 13 of the seat base 11.

The bearing plates 15 of both embodiments have a central opening 57, i.e., an opening lying in the axial direction of the screw spindle 27, which participates in the swinging movement, which opening serves for the unimpeded passage of a stop plate 58 which extends beyond the cross section of the screw spindles 27, with corresponding amplitude of the seat-surface support 7. In the embodiment shown in FIGS. 5 and 6 a shock absorber of customary construction is interposed between the seat-surface support 7 and the seat-base frame 11. This shock absorber is connected on the one hand via the pivot pin 59 and on the other hand by the pivot pin 60 to the parts which are arranged movably with respect to each other.

In the embodiments shown in FIGS. 7 to 15, the adjusting device 70 bears a seat (not shown in detail). This seat is fastened on the seat-surface support 7 of the adjusting device 70. The seat-surface support 7 consists of two U-rails 8 which are connected with each other via a transverse member 10 fastened in the region of the ends of the rails. The transverse member 10 extends vertically and forms the front wall of the seat-surface support 7.

The seat-surface support 7 is adjustable in height with respect to the seat base 11 bearing it and is supported centrally by a conical force-storage compression spring 12. The seat base is also designed as a frame. It also has U-rails 13. The latter are connected with each other by a transverse member 14 and a supporting plate 15 arranged in the central region of the frame.

The supporting plate 15 rests on the bottom U-arms 13' of the rails 13 and forms the support for the compression spring 12 whose largest spring turn 12' rests here, supported radially by lugs 16.

Seat-surface support 7 and seat-base frame 11 are connected via the crossing links 17, 18. The latter extend in the immediate vicinity of the tails 8 and 13. The links 17 swing around fixed pivot pins 19 of the seat-base frame 11, while the links 18 swing around fixed pivot pins 20 of the seat-surface support 7. The free ends of both links bear guide pins 22 which are provided with rollers 21 and extend into the U-space of the corresponding rails 8 and 13 respectively. At the point of intersection of the two links, a pivot pin 23 is provided. This link coordination results in a displacement of the seat support 7 parallel to the seat-base frame 11. Accordingly, the interposed force-storage compression spring 12 is acted on by pressure in the axis $x$—$x$, also upon a change in the spring resistance. This change is transmitted via an abutment 26 lying coaxial to the compression spring 12. The abutment is seated on a threaded spindle 27. The latter extends from the bottom of the seat-surface support 7 into the inside of the compression spring 12. The abutment has an internal thread 28 and has a centering projection 29 which extends by an amount equal to the cross section of the spring wire into the end turn 12'' which is of correspondingly large dimension.

The pressing pressure established by the tensioning of the spring is sufficient to hold the abutment 26 fixed in position with respect to the rotatably arranged spindle 27.

The spindle 27 bears a gear 30 which is firmly connected to it. This gear has spur toothing and rests on the side surface against the supporting plate 31 which supports it. The gear 30 cooperates with an adjusting-device drive gear 32 which is also supported in the plate 31 and is designed as a transmission. On the downward point shaft 33 of said gear, an extension 71 is seated in the first embodiment shown in FIGS. 8 to 11. The extension 71 is turnable around the shaft 33. Via a swing-lever bearing pin 72, a swing lever 73 is arranged swingably on the extension 71. The swing lever 73 is formed by the adjusting-device operating lever 74. A clamping plate 75 is firmly welded to said swing lever 73. The front edge 75' of this clamping plate extends up to the spur gearing of the adjusting-device drive gear 32 and is concave. The edge zones of the front edge 75' form locking flanks 76, 77.

In the end section 75'' of the clamping plate 75 there is provided a continuous transverse slot 78 which extends also through the swing lever 73 and is traversed by a displaceable switch handle 79. The switch handle 79 has the cylindrical central section 79', which is guided in the transverse slot 78 and forms on top an operating section 79'' of larger cross section which lies on the clamping plate. At the opposite end of the switch handle 79 there is provided an abutment 79''' also of larger cross section, which has a resting surface 80.

When the switch handle 79 assumes the position shown in FIG. 8, the adjusting-device operating lever 74 is swung in drive direction M1, until the locking flank 77 of the clamping plate 75 comes into contact with the addendum circle of the adjusting-device drive gear 32. If the adjusting-device operating lever 74 is swung further in the direction of the arrow M1, the adjusting-device drive gear 32 is carried along by the locking flank 77 in the direction of the arrow M1. At the same time, the resting surface 80 of the switch handle 79 comes against the end surface 71' of the extension 71, so that the latter is also swung in the direction indicated by the arrow M1.

Upon the free backward swinging of the adjusting-device operating lever 74 in the direction of the arrow M2, as shown in FIG. 9, the locking flank 77 comes out of its position resting against the adjusting-device drive gear 32, the adjusting-device operating lever 74 being at first alone swung until the resting surface 80 of the switch handle 79 on the other side of the axial extension a-a on the section 81 of the end surface 71' of the extension 71 comes against the end surface 71'. Now the extension 71 is again swung back in the direction indicated by the arrow M2. In this way the pivot point of the adjusting-device operating lever 74 is formed by the shaft 33, so that upon the further swinging of the operating lever 74 in the direction indicated by the arrow M2, the locking flank 76 cannot come in undesired manner against the adjusting-device drive gear 32. The lever 73 can also, with the locking flanks 76, 77 of the clamping plate 75, cooperate in the function described with a disk, not shown in the drawing, which disk can then be connected in suitable fashion with the drive gear 32.

Figure 10:
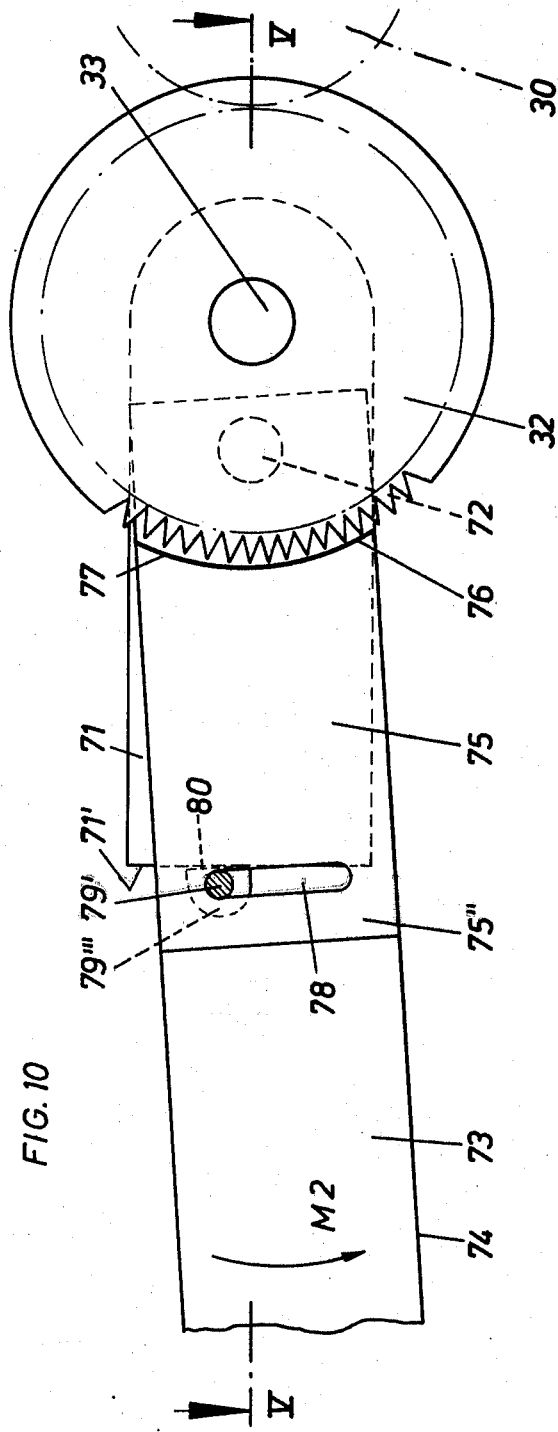
FIG. 10 is an elevation of the setting-device operating lever and setting-device drive gear upon swinging in direction to loosen the force-storage compression spring in accordance with the first embodiment.
Figure 11:
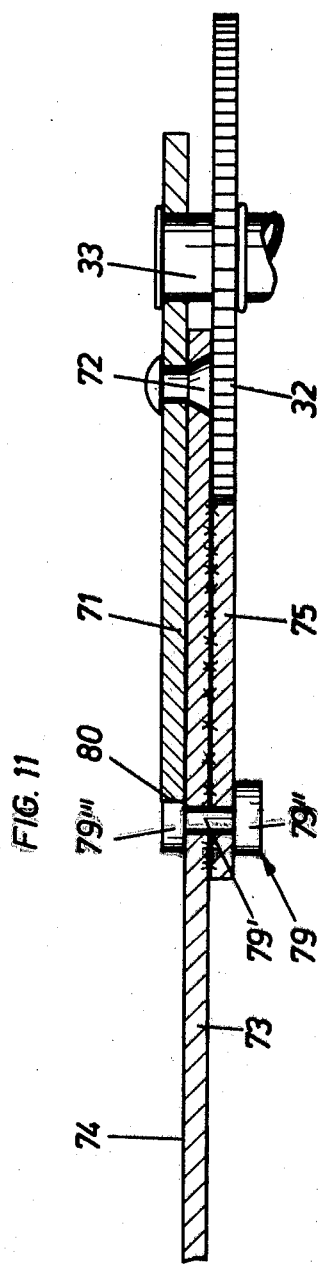
FIG. 11 is a cross section along the line V—V of FIG. 10.

In the switching handle 79 is pushed into the position shown in FIG. 10, the adjusting-device drive gear 32 is carried along in the direction indicated by the arrow M2.

In the further embodiment shown by way of example in FIGS. 12 to 15, the adjusting-device drive gear 32 is carried along by a form-locked drive. In this connection the adjusting-device operating lever 82 acts directly on the shaft 33 of the drive gear 32 and is swingable around the latter. The operating lever 82 has the actuating section 82' and the driving section 82''. On the longitudinal axis L of the operating lever 82 there is seated, on the driving section 82'', a pawl pivot pin 83 which forms the pivot of a locking pawl 84. The locking pawl 84 on its side 84' facing the drive gear 32 has, on both sides of the longitudinal axis L—L, a locking tooth 85, 86. In the region of the locking tooth 85, a bearing lug 87 extends from the transverse side 84'' of the locking pawl 84, said lug bearing a pin 88 which serves as fastening for the one end of a locking-pawl tension spring 89. The other end of the locking-pawl tension spring 89. The other end of the locking-pawl tension spring 89 is fastened to a holding lug 90 which is arranged on the longitudinal side 91 of the driving section 82'' of the operating lever 82 in vertical position.

The pawl 84 is connected with a slide piece 93 serving as a switch handle by a connecting piece 92, which is fastened to the section thereof lying close on the transverse side 84''. The slide piece 93 is longitudinally guided in a longitudinal slot 94 of a handle 95 which is associated with the adjusting device operating lever 82 on the actuating section 82' and is counter-sunk in the handle. The connecting piece 92 is guided in the handle 95 in a channel 96 below the operating lever 82. The section 92' of the connecting piece 92, which extends out of the handle 95, passes through an opening 97 in a bent section 98 of the operating lever 82 and thus passes within the region of the locking pawl 84 into a plane lying above the detent section 52.

In the position of the slide piece 93 shown in FIG. 15, the locking pawl 84 and thus the locking-pawl tension spring 89 assume a position at right angles to the longitudinal axis L—L of the operating lever 82, so that the locking-pawl tension spring 89 lies in the dead-center line T—T. A displacement of the slide piece 93 in the direction indicated by the arrow S1 causes a swinging of the pawl 84 aroung its pivot 83 in such a manner that the pawl tension spring 89 passes out of its dead-center position and by its swing action swings the pawl 84 to such an extent that the locking tooth 85 comes into tooth engagement with the gear rim of the adjusting-device drive gear 32. If the adjusting-device operating lever 82 is now swung in driving direction M1, the adjusting-device drive gear 32 is carried along in the direction indicated by the arrow M1 by the tooth engagement of the locking teeth 85.

Upon the swinging of the operating lever 82 back in driving direction M2, the locking tooth 85, via the oblique plane of the tooth flank 85', disengages in ratchet-like fashion from the tooth engagement with the drive gear 32, so that the lever 82 swings back freely, while the drive gear 32 remains in its position.

In the dead-center position of the locking pawl 84, a distance A remains between the tip of the locking tooth 85 and the drive gear 32, from which it can be seen that upon the free swinging back of the operating lever 82 and the resultant disengagement of the locking tooth 85, the tension spring 89 does not move up into its dead-center position. In this way the pawl 84, upon the ratchet-like backward swinging of the operating lever 82, in the direction indicated by the arrow M2, remains urged by spring in the tooth-engagement direction.

Upon displacement of the slide piece 93 in the direction indicated by the arrow S2, as shown in FIG. 13, the pawl 84 is so swung about its pivot 83 that the pawl tension spring 89 now produces a spring-urged tooth engagement of the tooth 86 with the gear rim of the drive gear 32. Upon the swinging of the operating lever 82 in the direction indicated by the arrow M2, the drive gear 32 is now carried along in the driving direction M2. The ratchet-like swinging back of the operating lever 82 takes place here in the in the same manner with continuous spring urging in tooth-engagement direction by the tension spring 89.

We claim:

1. A seat, particularly for automotive vehicles, comprising
   a seat-surface support, a seat base including links,
   said seat-surface support being spring-biased in vertical direction and guided by said links of said seat base,
   a force-storage compression spring disposed below said seat-surface support,
   an abutment means associated with one end of said force-storage compression spring for adjustment of the initial spring tension by displacement of the height of said abutment means,
   a threaded spindle supporting said abutment means,
   a switch ratchet mechanism actuating said threaded spindle, and
   the latter extending into the inside of said compression spring, and
   said threaded spindle is provided with a gear, the latter being disposed at the bottom of said seat-surface support,
   a transmission gear including a shaft, said threaded spindle gear engages with said transmission gear and said shaft includes a switch ratchet mechanism having a ratchet wheel,
   the latter includes an operating swing lever, which extends beyond the front edge of said seat surface support.

2. The seat, as set forth in claim 1, wherein
   said compression spring is conical and has one end of smaller cross-section,
   said threaded spindle protrudes from the bottom of said seat surface support and is supported thereon, as well as enters into said end of smaller cross-section of said compression spring.

3. The seat, as set forth in claim 1, wherein
   said switch ratchet mechanism has an operating handle, which simultaneously serves for the switching of the active direction of locking.

4. The seat, as set forth in claim 3, which includes
   a locking bolt, said locking bolt is axially displaceable against spring action and turnable in its displaced position, as well as extends coaxially in said operating swing lever of said switch ratchet mechanism, and the end of said locking bolt forming a tooth which engages said ratchet wheel.

5. The seat, as set forth in claim 3, which includes
   end stops for said operating swing lever, a slide bow extends up to said end stops,
   said slide bow is bent corresponding to the radius of swing of said operating swing lever, and
   a slide piece extends over said operating lever.

6. The seat, as set forth in claim 1, which includes
   a switch locking mechanism comprising two facing locking flanks,
   a switch handle, said locking flanks being capable of being brought into engagement with respect to said adjusting-device drive gear.

7. The seat, as set forth in claim 6, wherein
   said swing lever comprises an adjusting-device operating lever, the latter being supported on the other side of the axis of said adjusting-device drive gear,
   an extension seated on the shaft of said drive gear and bearing a switch handle displaceable in a transverse slot and lying in front of the end surface of said extension and brought alternately one of opposite sides of an axial extension of a swing-lever journal pin and the axis of said adjusting-device drive gear.

8. The seat, as set forth in claim 7, wherein
   said extension is disposed below said swing lever,
   said switch handle is provided below said swing lever with an abutment lying flat in front of its end surface.

9. The seat, as set forth in claim 6, wherein said swing lever comprises a rocker-shaped pawl supported on an adjusting-device operating lever and spring urged in the direction of engagement,
said rocker-shaped pawl having terminal locking teeth and capable of being brought by a switch lever into position of tooth engagement with respect to said adjusting device drive gear.

10. The seat, as set forth in claim 8, wherein
said pawl is adjustable by means of a slide piece serving as switch handle, and
said switch handle is slot guided in said handle of said adjusting-device operating lever.

11. The seat, as set forth in claim 8, wherein
said pawl has associated therewith a neutral central position in which the pawl tension spring is in the dead center line with respect to said pawl pivot pin.

12. An adjustable seat comprising:
a seat surface support;
a seat base disposed below said support;
a pair of articulated links interconnecting said base and said support for constraining said support to vertical movement relative to said base;
a conical compression spring having a large end seated upon said base and a small end turned toward said support;
a threaded spindle journaled on said support and extending axially downwardly into said spring through said small end thereof;
a spring seat threaded onto said spindle and bearing against said small end of said spring;
a first gear resting against the underside of said support and connected to said spindle;
a second gear journaled at the underside of said support and meshing with said first gear for driving same to rotate said spindle; and
a manually reversible ratchet mechanism operatively connected to said second gear for driving same.

* * * * *